United States Patent
Harrell et al.

(10) Patent No.: US 10,298,814 B2
(45) Date of Patent: May 21, 2019

(54) SELF-CALIBRATING MULTI-CAMERA ALIGNMENT SYSTEM

(71) Applicant: SNAP-ON Incorporated, Conway, AR (US)

(72) Inventors: Rodney Harrell, Greenbriar, AR (US); Brian K. Gray, Conway, AR (US); David A. Jackson, Point Roberts, WA (US); Ronald D. Swayne, Sherwood, AR (US); Darwin Y. Chen, Conway, AR (US); Bryan C. Minor, Conway, AR (US)

(73) Assignee: SNAP-ON Incorporated, Kenosha, WI (US)

( * ) Notice: Subject to any disclaimer, the term of this patent is extended or adjusted under 35 U.S.C. 154(b) by 925 days.

(21) Appl. No.: 14/463,604

(22) Filed: Aug. 19, 2014

(65) Prior Publication Data
US 2015/0049188 A1 Feb. 19, 2015

Related U.S. Application Data

(60) Provisional application No. 61/867,276, filed on Aug. 19, 2013.

(51) Int. Cl.
*H04N 5/20* (2006.01)
*H04N 5/225* (2006.01)
(Continued)

(52) U.S. Cl.
CPC ......... *H04N 5/2251* (2013.01); *F16M 11/046* (2013.01); *F16M 11/18* (2013.01);
(Continued)

(58) Field of Classification Search
None
See application file for complete search history.

(56) References Cited

U.S. PATENT DOCUMENTS 4,298,907 A * 11/1981 Holt, Jr. ................. G03B 15/03
362/18
5,323,098 A * 6/1994 Hamaguchi ......... B60L 11/1822
191/4
(Continued)

FOREIGN PATENT DOCUMENTS

CN     1734231 A    2/2006
CN   101707890 A    5/2010
(Continued)

OTHER PUBLICATIONS

Notification of Transmittal of the International Search Report and the Written Opinion of the International Searching Authority for International Application No. PCT/US2014/051753 dated Dec. 18, 2014.

(Continued)

*Primary Examiner* — Mikhail Itskovich
(74) *Attorney, Agent, or Firm* — Miles & Stockbridge PC

(57) ABSTRACT

A portable vehicle alignment system is provided having two base tower assemblies, each having a pedestal, a columnar tower removably attachable to the top of the pedestal, and a camera pod movable along a length of the tower; and a data processor with a wireless communication device for processing image data from the camera pods. Each camera pod includes a camera for capturing image data of a target mounted on a vehicle, and a communication device for wirelessly communicating with the data processor. One pod has a calibration target and the other pod has a calibration camera for capturing images of the calibration target. The pedestals each have a manually-operated clamp for removably fixedly attaching the tower to the pedestal in one of a plurality of positions such that the orientation of the camera pod to the pedestal is angularly adjustable, allowing horizontal rotation of the camera pod.

25 Claims, 15 Drawing Sheets

(51) Int. Cl.
*G01B 11/275* (2006.01)
*H04N 5/232* (2006.01)
*H04N 17/00* (2006.01)
*F16M 11/04* (2006.01)
*F16M 11/18* (2006.01)
*F16M 11/20* (2006.01)
*F16M 11/38* (2006.01)

(52) U.S. Cl.
CPC ......... *F16M 11/2014* (2013.01); *F16M 11/38* (2013.01); *G01B 11/2755* (2013.01); *H04N 5/23206* (2013.01); *H04N 17/002* (2013.01); *G01B 2210/143* (2013.01)

(56) References Cited

U.S. PATENT DOCUMENTS

| | | | |
|---|---|---|---|
| 5,436,542 A * | 7/1995 | Petelin | B25J 9/1679 318/567 |
| 5,535,522 A | 7/1996 | Jackson | |
| 5,828,986 A | 10/1998 | Horigome | |
| 6,298,284 B1 | 10/2001 | Burns | |
| 6,341,013 B1 | 1/2002 | Battiti | |
| 6,447,236 B1 * | 9/2002 | Grams | B25J 15/10 209/900 |
| 6,968,282 B1 | 11/2005 | Jackson | |
| 7,424,387 B1 | 9/2008 | Gill | |
| 7,922,424 B2 * | 4/2011 | Clark, II | B23D 57/0007 405/156 |
| 2002/0189115 A1 * | 12/2002 | Jackson | G01B 11/002 33/286 |
| 2009/0073425 A1 * | 3/2009 | Kling, III | G01B 11/2755 356/139.09 |

FOREIGN PATENT DOCUMENTS

| | | |
|---|---|---|
| CN | 101842660 A | 9/2010 |
| CN | 201916656 U | 8/2011 |
| DE | 2948573 | 9/1981 |
| EP | 0971205 | 1/2000 |
| WO | 97/14016 A1 | 4/1997 |
| WO | 20090056392 | 5/2009 |

OTHER PUBLICATIONS

Notification of Transmittal of the International Search Report and the Written Opinion of the International Searching Authority for International Application No. PCT/US2014/051754 dated Dec. 18, 2014.

Extended European Search Report dated Mar. 9, 2017 for International Application No. PCT/US2014/051754.

Office Action dated Dec. 4, 2017 for related Chinese Patent Application No. 201480048837.1.

* cited by examiner

LEFT UPRIGHT                    RIGHT UPRIGHT

SELF-CALIBRATING MULTI-CAMERA ALIGNMENT SYSTEM

RELATED APPLICATIONS

The present application claims priority to U.S. Provisional Application No. 61/867,276, entitled "Improved Self-Calibrating Multi-Camera Alignment System," filed Aug. 19, 2013, which is incorporated herein by reference in its entirety.

FIELD

Embodiments relate generally to machine vision vehicle wheel alignment systems and methods, and more particularly to machine vision alignment systems having movable cameras that continuously self-calibrate their position relative to that of vehicle-mounted targets.

BACKGROUND

Machine vision vehicle alignment systems using movable cameras and targets attached to vehicle wheels are well known. The targets are viewed by the cameras such that image data obtained for a prescribed alignment process can be used to calculate vehicle alignment angles for display through a user interface, usually a computer monitor. Early system implementations included rigid beams that connected the cameras so that their position and orientation with respect to each other could be determined and be relied upon as unchanging. Later system implementations were introduced comprising the use of cameras not rigidly connected to each other, but using a separate camera/target system to continuously calibrate the position of one vehicle mounted target viewing camera to another. This type of system is described in U.S. Pat. Nos. 5,724,743; 5,535,522; 6,931,340; 6,959,253; and 6,968,282, all of which are hereby incorporated by reference herein.

Camera based wheel aligner systems are typically shipped in large boxes and installed by trained technicians. The system usually includes parts that cannot be easily and safely handled by a single technician, often requiring assistance from the customers or a second technician. For example, these alignment systems comprise a camera support mechanism to allow the cameras to be positioned and directed as required to incorporate a field of view including targets attached to vehicle wheels. The camera support mechanism usually comprises of some type of solid base or beam that is fixed to the ground so that the cameras are solidly supported. Some alignment systems use solid horizontal beams that permanently fix the distance and orientation between the cameras, while other systems use solid vertical beams and cameras that travel along the beams as necessary to maintain the targets in the camera field of view. Given the constraint of maximum vehicle dimensions, the camera supporting beams are long and heavy enough to make handling during installation difficult for a single person. A need exists for a more modular installation approach using parts that can be easily handled by one person.

In addition, each installation site poses specific challenges with regard to the physical limitations of the shop environment, including the availability of power and floor space. Space constraints and power availability locations of the specific shop create problems that cannot be solved by a large, inflexible system.

Once installation is complete, the system is typically fixed to the floor and cannot be easily relocated or adjusted by the end user. Accordingly, a need exists for an alignment system that can be moved safely and easily by an end user when a need is identified, and has the flexibility for minor adjustment without physical movement of the supporting structure.

SUMMARY

One or more embodiments can include a portable vehicle alignment system comprising a pair of base tower assemblies, each base tower assembly comprising a pedestal, a columnar tower removably attachable to a top portion of the pedestal to extend substantially vertically upward from the pedestal, and a camera pod mounted to move along a length of the tower. The system further includes a data processor for processing image data from the camera pods, and having a wireless communication device. A first one of the camera pods comprises a first camera for capturing image data of a first target mounted on a vehicle, a calibration target disposed in a fixed relationship to the first camera, and a wireless communication device for communicating with the data processor's wireless communication device. A second one of the camera pods comprises a second camera for capturing image data of a second target mounted on the vehicle, a calibration camera disposed in a fixed relationship to the second camera for capturing images of the calibration target, and a wireless communication device for communicating with the data processor's wireless communication device. The base tower assemblies are each separately movable by a user, and each of the pedestals comprises a manually-operated clamp proximal its top portion for removably fixedly attaching the tower to the pedestal in one of a plurality of positions such that the orientation of the camera pod to the pedestal is angularly adjustable, allowing horizontal rotation of the camera pod.

Embodiments can further include a portable vehicle alignment system comprising a pair of base tower assemblies, each base tower assembly comprising a pedestal, a columnar tower removably attachable to a top portion of the pedestal to extend substantially vertically upward from the pedestal, and a camera pod mounted to move along a length of the tower. The system further includes a data processor for processing image data from the camera pods, and having a wireless communication device. A first one of the camera pods comprises a first camera for capturing image data of a first target mounted on a vehicle, a calibration target disposed in a fixed relationship to the first camera, and a wireless communication device for communicating with the data processor's wireless communication device. A second one of the camera pods comprises a second camera for capturing image data of a second target mounted on the vehicle, a calibration camera disposed in a fixed relationship to the second camera for capturing images of the calibration target, and a wireless communication device for communicating with the data processor's wireless communication device. Each pedestal comprises a power supply electrically connected to its camera pod for supplying all electrical power needed to operate its camera pod, each power supply having a battery.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

It should be understood that the principles described herein are not limited in application to the details of construction or the arrangement of components set forth in the following description or illustrated in the following drawings. The principles can be embodied in other embodiments and can be practiced or carried out in various ways. Also, it is to be understood that the phraseology and terminology used herein is for the purpose of description and should not be regarded as limiting.

This disclosure describes a camera based aligner system that includes enhancements directed at improving the safety, flexibility and functionality of the installation. According to one aspect of this disclosure, a multi-piece support beam is provided, to reduce the maximum weight of the camera support beam so that the beam can be safely handled by a single person.

According to another aspect of this disclosure, an aligner system is made portable by providing easily moveable camera support beam assemblies which can be quickly and safely moved from one shop bay to another without the need for intervention by a factory technician to provide relocation and calibration services. As a further related aspect of this disclosure, docking stations are provided (e.g., at each shop bay where a vehicle alignment could be performed) so that repositioning the aligner camera supports from one bay to another can be accomplished quickly, and the supports held securely in place once located as desired. Since power outlets are not always available at all locations in a shop, in certain embodiments the docking stations are supplied with power and network connections (e.g., Ethernet connections) so that the act of docking the camera support assemblies also makes necessary power and communication connections.

Another aspect of this disclosure addresses the need for small adjustments in the camera field of view to accommodate unusually large or small vehicles. A mechanism is provided to allow small field of view adjustments without moving the entire camera support beam assembly. A lock mechanism is provided to secure the camera position once the appropriate field of view is obtained.

Electrical power must be supplied to the camera assemblies travelling vertically along the camera support beams. In another aspect of this disclosure, a guide wire with a coiled power cable is provided to accomplish this task.

Synchronizing the movement of the cameras on multiple vertical camera support beams is necessary to maintain camera field of view of the wheel mounted targets. As the vehicle is raised on a lift, it is desirable to move the cameras to keep the targets near the field of view of the cameras. In another aspect of this disclosure, a DC motor is used in communication with the camera outputs to accomplish this task.

Figure 1A:
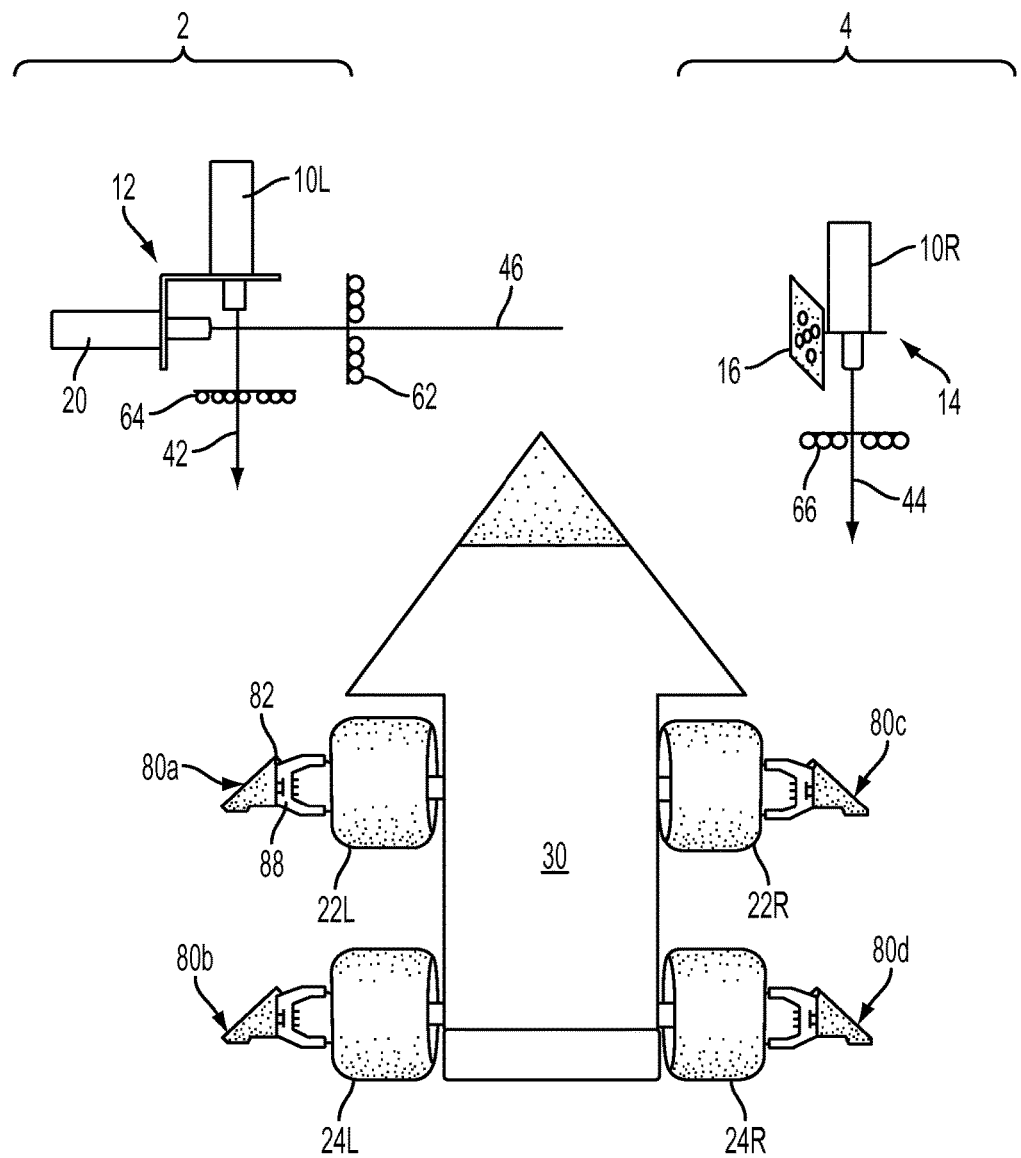
FIG. 1A is a schematic top plan view of a conventional 3D motor vehicle alignment system.

FIG. 1A is a schematic top plan view of certain elements of a conventional computer-aided, 3D motor vehicle wheel alignment system ("aligner"), such as disclosed in U.S. Pat. No. 6,968,282 discussed herein above. This aligner has elements in common with the presently disclosed aligner, which elements will now be described. The aligner of FIG. 1A generally comprises a left camera module 2 and a right camera module 4 that are used to align wheels of a motor vehicle. The terms "left" and "right" are used for convenience, and are not intended to require a particular element to be located in a particular location or relationship with respect to another element.

Arrow 30 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 22R, 24L, 24R, respectively. Each alignment target generally comprises a plate 82 on which target information is imprinted and a clamping mechanism 88 for securing the target to a wheel.

The left camera module 2 comprises a left alignment camera 10L and a calibration camera 20. Left alignment camera 10L faces the vehicle and views the left side targets 80a, 80b along axis 42. Camera 10L is rigidly mounted to left rigid mount 12. A calibration camera 20 faces the right camera module 4 and views a calibration target 16 along axis 46. The calibration camera 20 also is affixed rigidly to mount 12. In this exemplary embodiment, calibration camera 20 is illustrated as forming a part of left camera module 2. However, the calibration camera 20 also may be configured as part of right camera module 4, in which case its view would be directed leftward toward left camera module 2.

Right camera module 4 comprises a right camera 10R that faces the vehicle and functions as a second alignment camera in a 3D alignment system. Right camera 10R is affixed to a rigid camera mount 14. Calibration target 16 is rigidly affixed to camera mount 14 in a position visible to calibration camera 20 along axis 46.

Calibration camera 20 and left camera 10L are fixed in pre-determined, known positions. Similarly, right camera 10R and calibration target 16 are fixed in pre-determined, known positions. Thus, the relative position of calibration camera to left camera 10L is known, and the relative position of right camera 10R to calibration target 16 is also known.

For illuminating the calibration target 16 and wheel targets 80a-80d, left camera module 2 and right camera module 4 further may comprise light sources 62, 64, 66. A first light source 62 is aligned perpendicular to axis 46 to direct light along that axis to illuminate calibration target 16; a second light source 64 is aligned perpendicular to axis 42 to direct light along that axis to illuminate left side wheel targets 80a, 80b; and a third light source 66 is aligned perpendicular to axis 44 to direct light along that axis to illuminate right side wheel targets 80c, 80d. Each of the light sources 62, 64, 66 can comprise a plurality of light-emitting diodes (LEDs); however, any other light source may be used.

Figure 1B:
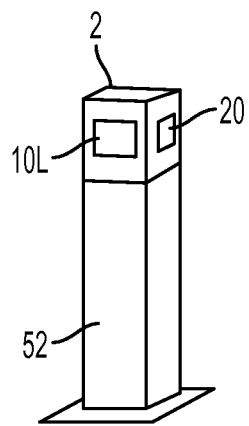
FIG. 1B is a diagram of upright elements of the alignment system of FIG. 1A
Figure 1B:
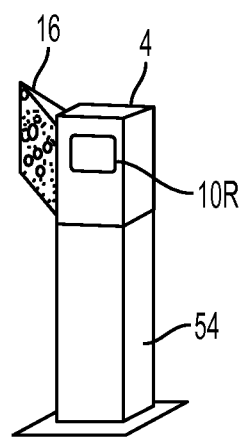
Figure 2:
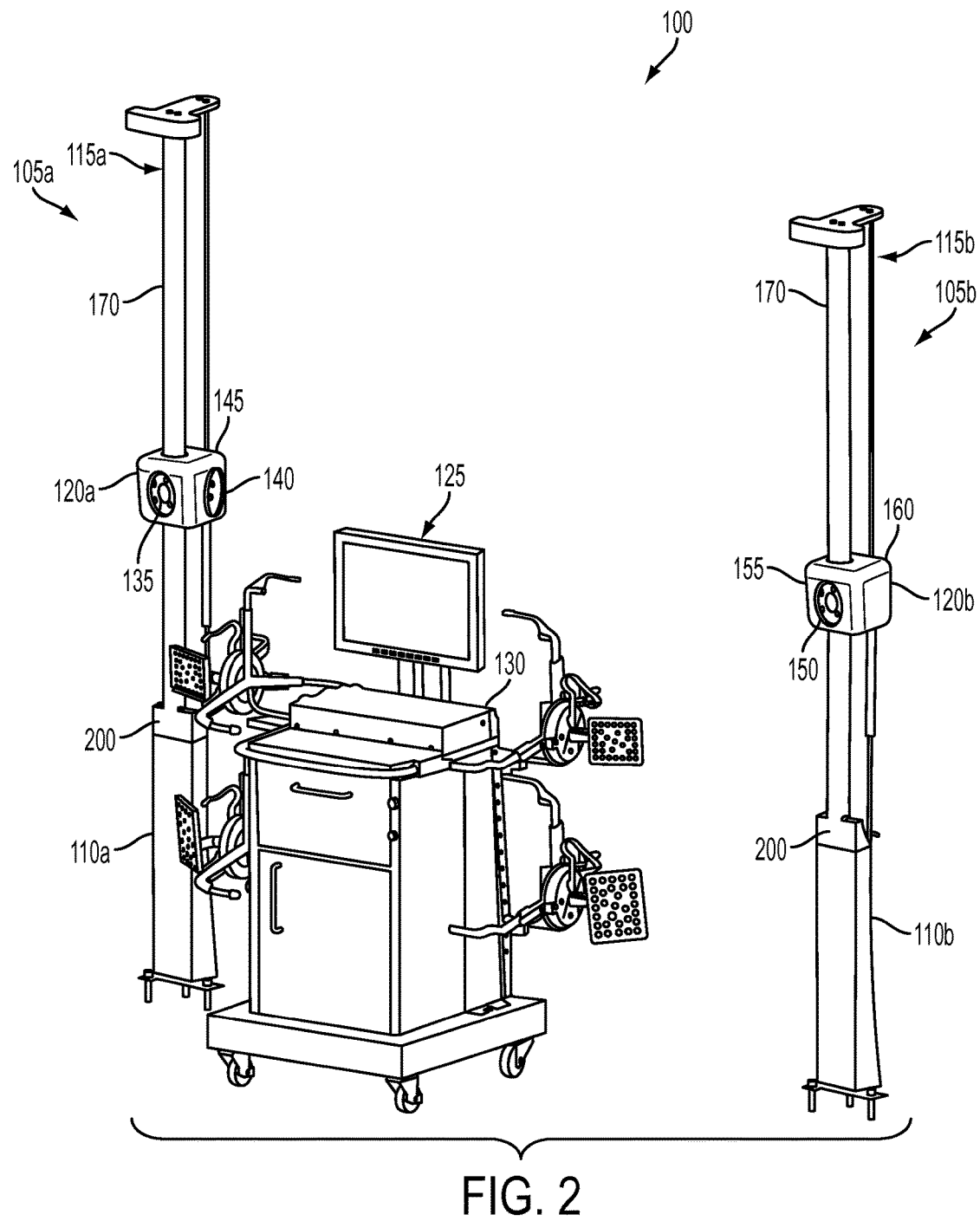
FIG. 2 is a front perspective view diagrammatically illustrating an exemplary alignment system according to various embodiments.

FIG. 1B is a diagram of a typical embodiment of the conventional aligner of FIG. 1A, which includes a left upright 52 and a right upright 54. Each upright 52, 54 comprises a rigid post that is affixed to an alignment rack or to the floor of a service facility. Left alignment camera 10L and calibration camera 20 are mounted within left upright 52, which serves as a protective enclosure and a rigid mount. The cameras may view the motor vehicle under alignment and the calibration target 16 through suitable apertures or windows in the upright 52. Right alignment camera 10R is mounted and enclosed within right upright 54, and camera 1 OR may view the vehicle through a suitable aperture or window in right upright 54. As discussed herein above, this arrangement of uprights affixed to the shop floor can be disadvantageous because they require more than one technician to install, and cannot be easily relocated or adjusted by the user.

Exemplary imaging alignment systems according to the present disclosure, comprising three wireless cameras, will now be described with reference to FIGS. 2-10. The three cameras each contain a wireless radio, such as a radio using a Bluetooth communications protocol, which communicates wirelessly to a central PC, sending and receiving digital data. No wires are required to connect the imaging cameras to the central PC. In an exemplary embodiment shown in FIGS. 2-5B, a portable vehicle alignment system 100 comprises a pair of base tower assemblies 105a, 105b, each base tower assembly 105a, 105b comprising a pedestal 110a, 110b, a columnar tower 115a, 115b removably attachable to a top portion of the pedestal 110a, 110b to extend substantially vertically upward from the pedestal 110a, 110b, and a camera pod 120a, 120b mounted to move along a length of the tower 105a, 105b. System 100 further comprises a data processor 125 for processing image data from the camera pods 120a, 120b, and having a built-in wireless communication device 130. Data processor 125 comprises, for example, a conventional personal computer (PC). Likewise, the wireless communication devices referred to herein are conventional devices known to those of skill in the art; for example, devices using standard Bluetooth communications protocol.

Figure 5A:
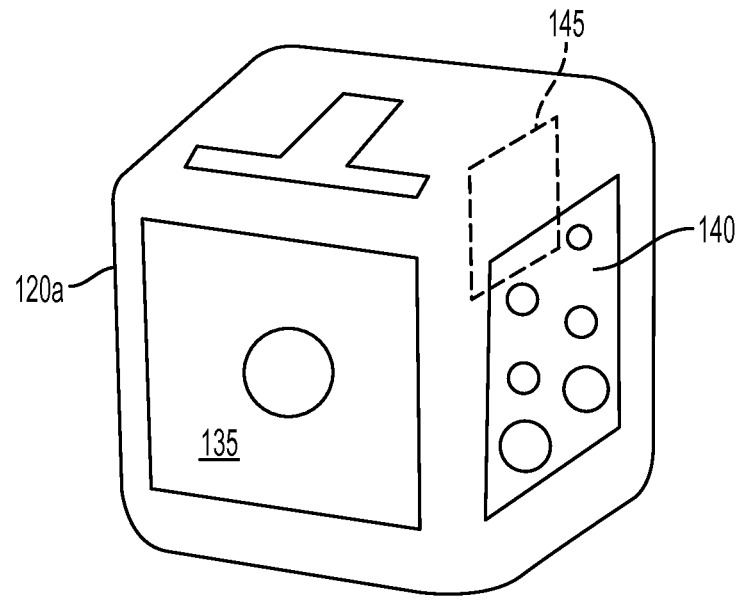
FIGS. 5A and 5B are perspective views diagrammatically illustrating exemplary camera pods according to various embodiments.

Referring now to FIG. 5A, a first one of the camera pods 120a comprises a first camera 135 for capturing image data of a first target, such as target 80a mounted on a vehicle 30 as shown in FIG. 1A. Camera pod 120a also comprises a calibration target 140 disposed in a fixed relationship to the first camera 135, and a wireless communication device 145 for communicating with the data processor's wireless communication device 130.

Figure 5B:
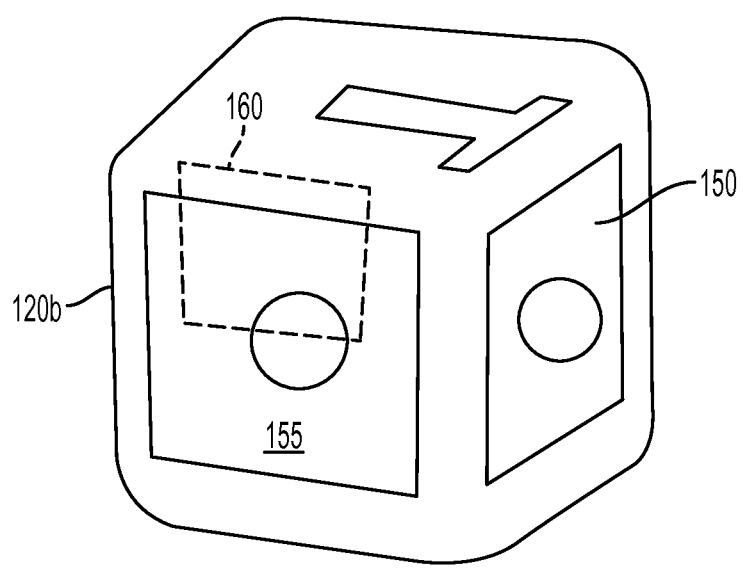

As shown in FIG. 5B, a second one of the camera pods 120b comprises a second camera 150 for capturing image data of a second target, such as target 80b mounted on vehicle 30 as shown in FIG. 1A. Camera pod 120b also comprises a calibration camera 155 disposed in a fixed relationship to the second camera 150 for capturing images of the calibration target 140, and a wireless communication device 160 for communicating with the data processor's wireless communication device 130. All the cameras 135, 150, 155 can be conventional cameras well-known to those of skill in the art; for example, CCD cameras.

Figure 5C:
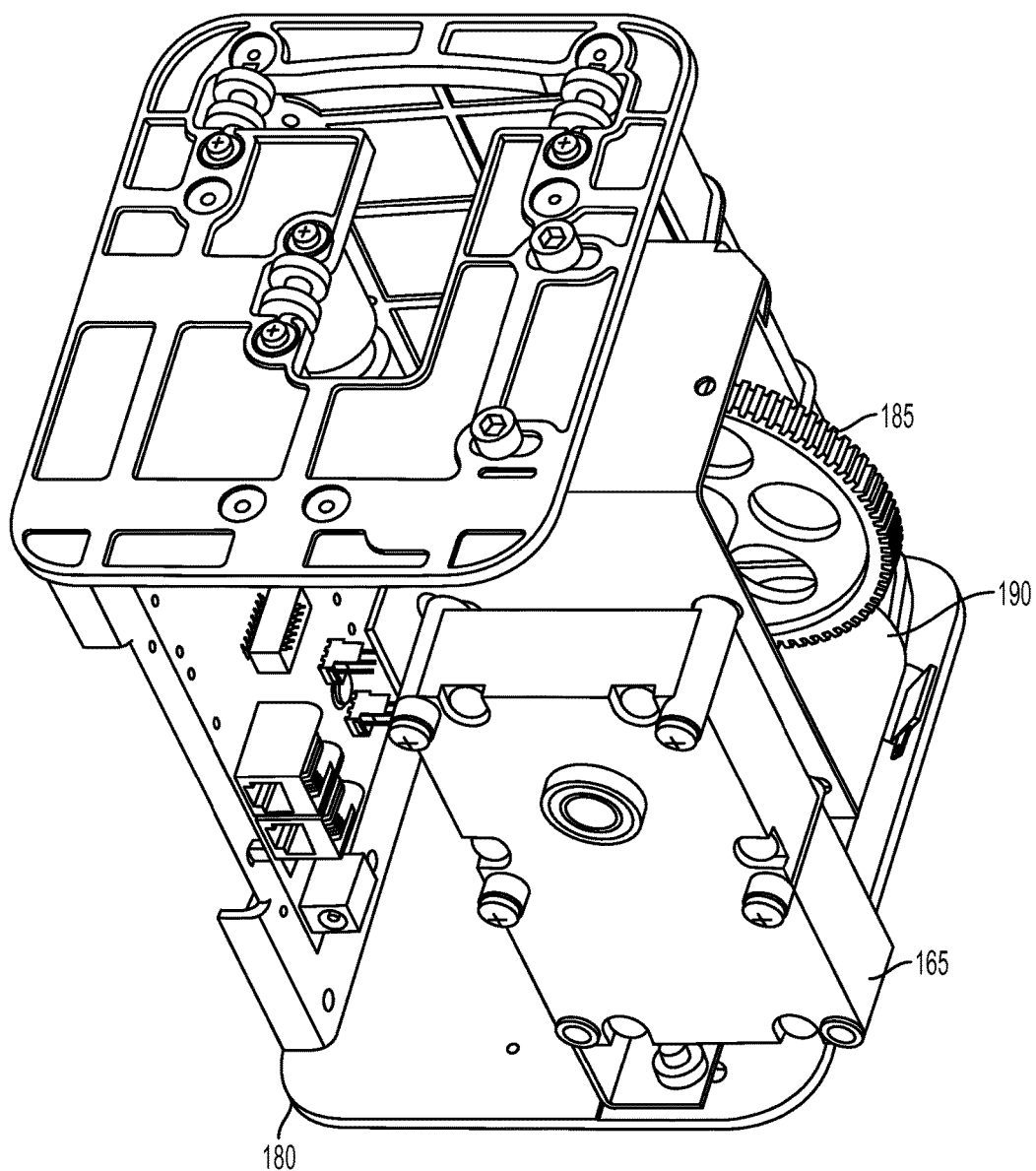
FIG. 5C is a perspective view diagrammatically illustrating an exemplary slide car of a camera pod according to various embodiments.
Figure 6:
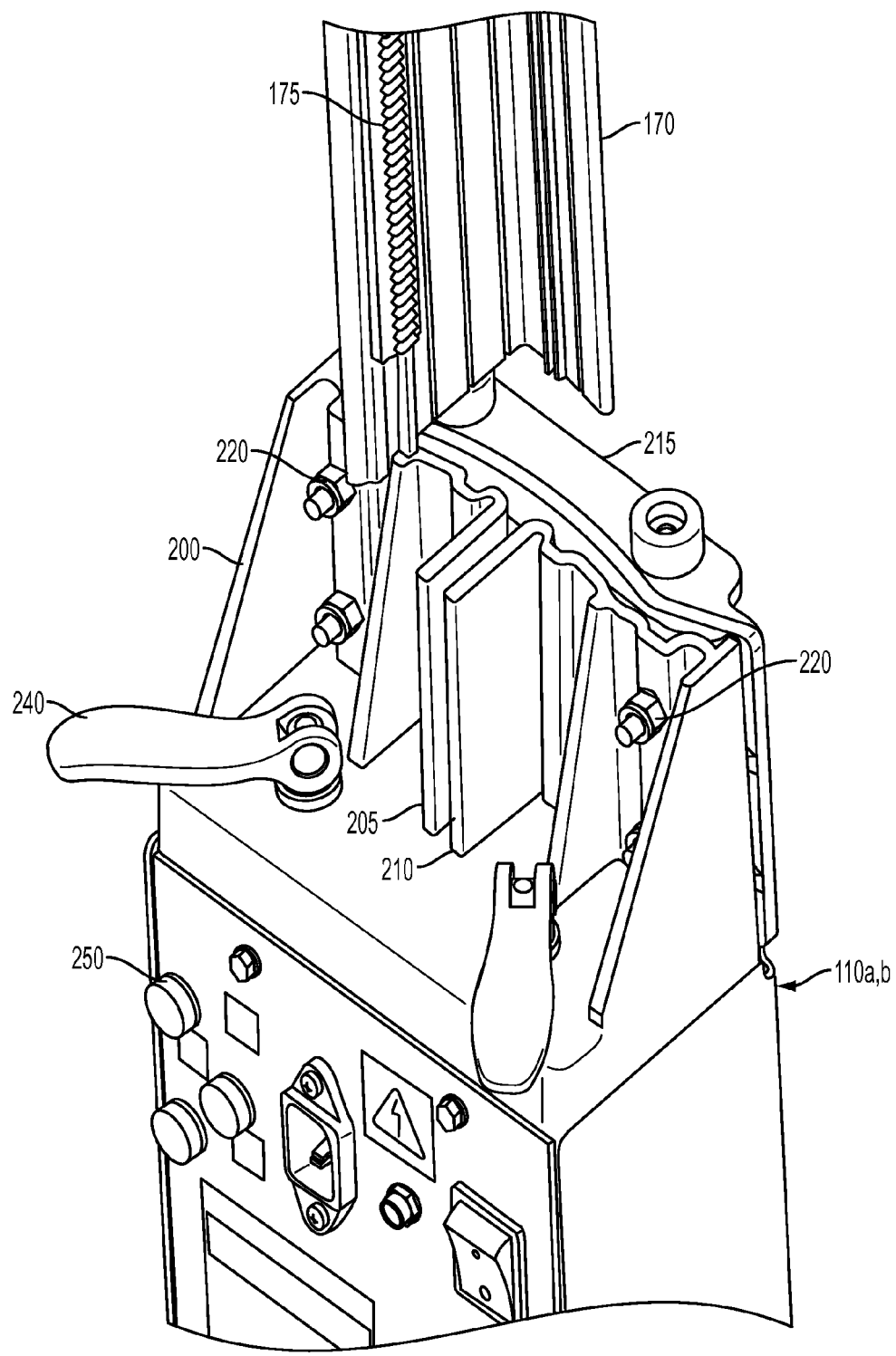
FIG. 6 is a perspective view diagrammatically illustrating an exemplary base tower assembly according to various embodiments.
Figure 7A:
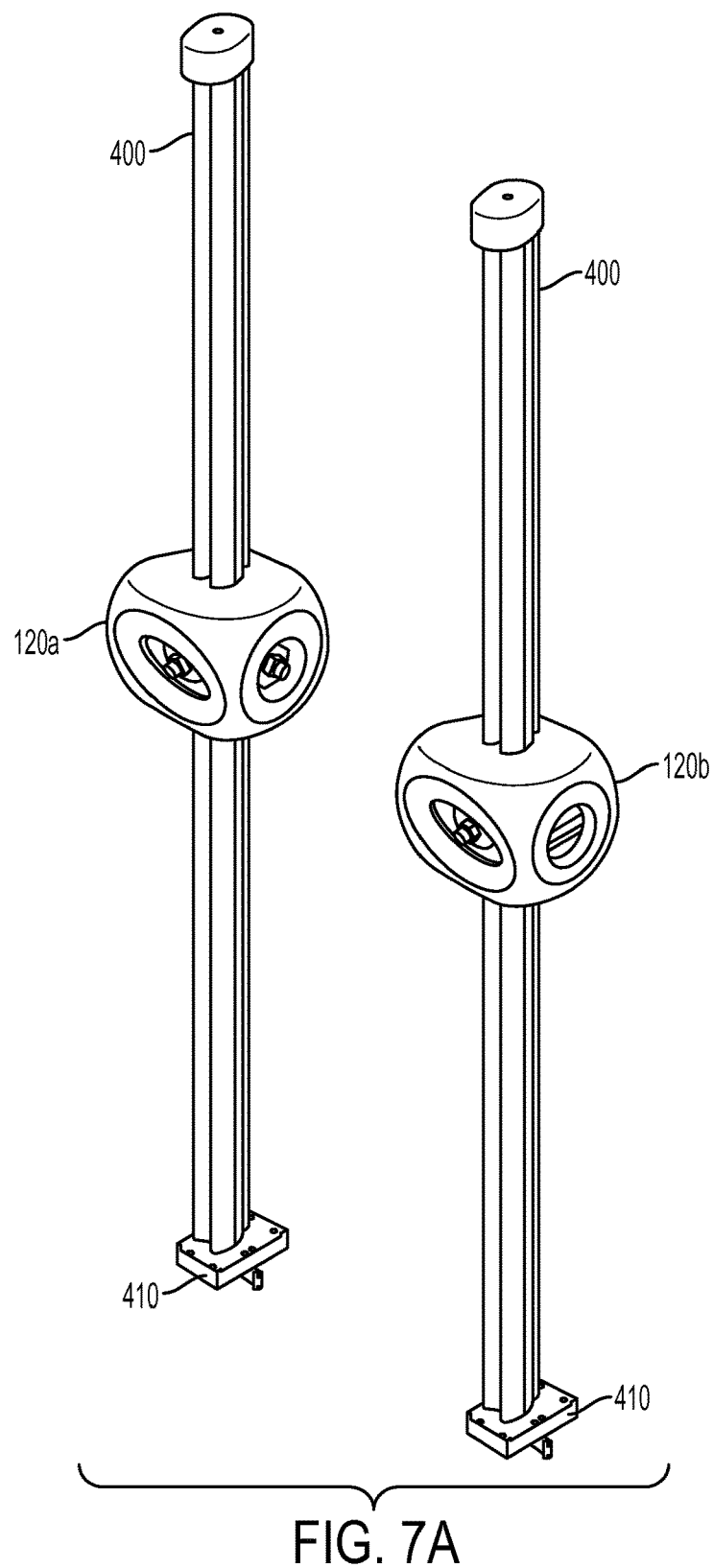
FIGS. 7A-F are views diagrammatically illustrating an exemplary camera pod drive mechanism according to various embodiments.
Figure 7B:
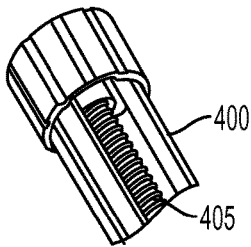
Figure 7C:
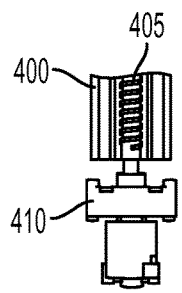
Figure 7D:
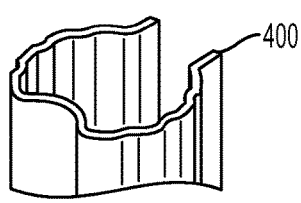
Figure 7E:
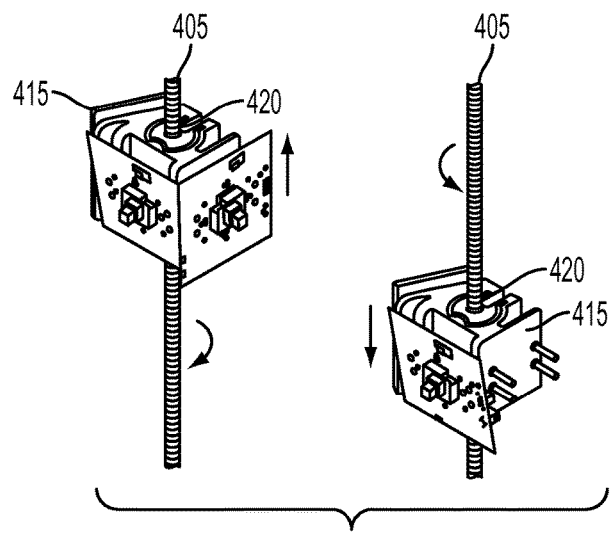
Figure 7F:
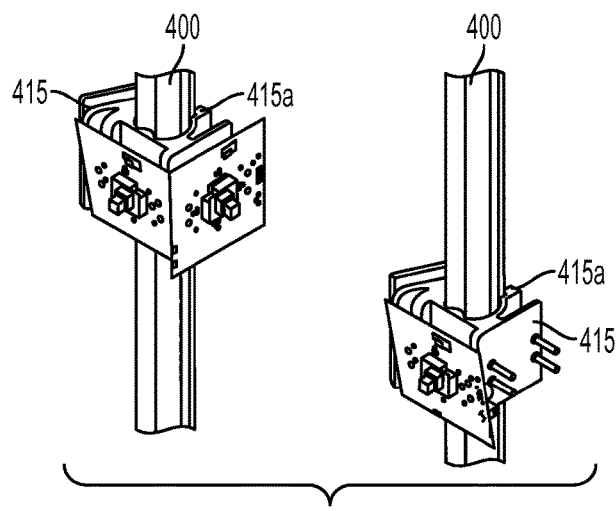

According to certain embodiments shown in FIG. 5C and FIG. 6, each camera pod 120a, 120b has a motor drive 165 to move the pod along the length of the columnar tower 115a, 115b. Each columnar tower 115a, 115b comprises a bar 170 having a T-shaped cross section, and the bar 170 has a linear rack of gear teeth 175. In certain embodiments, bar 170 comprises a T-shaped aluminum extrusion. Each tower's associated camera pod 120a, 120b has a slide car 180 for engaging the bar 170 to guide motion of the camera pod 120a, 120b along the bar 170, and the motor drive 165 of the associated camera pod has a pinion gear 185 for engaging the rack 175 to drive the camera pod 120a, 120b along a length of the bar 170. A conventional DC motor 190 can be used to move the camera pod 120a, 120b up and down the T-shaped bar 170.

In an alternative embodiment shown in FIGS. 7A-F, instead of a linear rack of gear teeth and a pinion gear to drive the camera pod 120a, 120b up and down the columnar tower 115a, 115b, a direct drive worm gear lead screw is provided to move the camera pod 120a, 120b. This drive system eliminates noise that can be created by a gear and rack drive system. Each tower 115a, 115b comprises a stationary bar 400, a lead screw 405, and a motor 410 (such as a DC motor) for rotating the lead screw 405. Each tower's associated camera pod 120a, 120b has a slide car 415 (see FIGS. 7E-7F) for engaging the bar 400 to guide motion of the camera pod along the bar 400; e.g., for preventing rotation of the camera pod 120a, 120b as it moves relative to the tower 115a, 115b. The slide car 415 comprises a threaded portion 420 for engaging the lead screw 405 to drive the camera pod 120a, 120b along a length of the bar 400 when the lead screw 405 is rotated by the motor 410. In certain embodiments, the slide car 415 and its threaded portion 420 are integrally formed of a plastic material.

The stationary bar 400 can be made from a variety of materials; e.g., roll formed steel, extruded aluminum, extruded plastic. In some embodiments, the length of bar 400 is approximately 75 inches. In the embodiment shown in FIGS. 7E-7F, the shape of bar 400 is such that a custom shaped (e.g., molded) plastic bushing 415a which is part of the slide car 415 fits over the exterior surface of the bar 400 and provides a plastic low friction bearing. The lead screw 405 goes through plastic threaded bushing 415a. When the lead screw 405 is rotated by the motor 410, the bushing 415a will move up and down the bar 400. The bushing 415a is attached to the camera pod 120a, 120b, such that the camera pod 120a, 120b and bushing 415a move simultaneously with the rotation of the lead screw 405.

The movements of the two camera pods 120a, 120b up and down are kept synchronous by utilizing the calibration camera 155 and calibration target 140, along with wheel target information from the vehicle 30. The processing of this information allows the data processor 125 to adjust the motor speed to keep the camera pods 120a, 120b in sync with each other, and adjusts the pod speed to stay in synch with movement of a vehicle lift (not shown) on which the vehicle 30 can be carried while the alignment is being performed.

The base tower assemblies 105a, 105b can be broken into shorter elements for minimal length of packaging during transportation, shipping and warehousing, and are each separately movable by a user. In certain embodiments, each of the pedestals 110a, 110b comprises a manually-operated clamp 200, such as shown in FIG. 6, proximal its top portion for removably fixedly attaching the columnar tower 115a, 115b to the pedestal 110a, 110b in one of a plurality of positions. Clamp 200 provides the orientation of the camera pod 120a, 120b to the pedestal 110a, 110b to be angularly adjustable, allowing horizontal rotation of the camera pod 120a, 120b (see arrows A in FIG. 4), which may become necessary on occasion to slightly adjust the position of the camera pods with respect to the wheel targets.

Figure 8A:
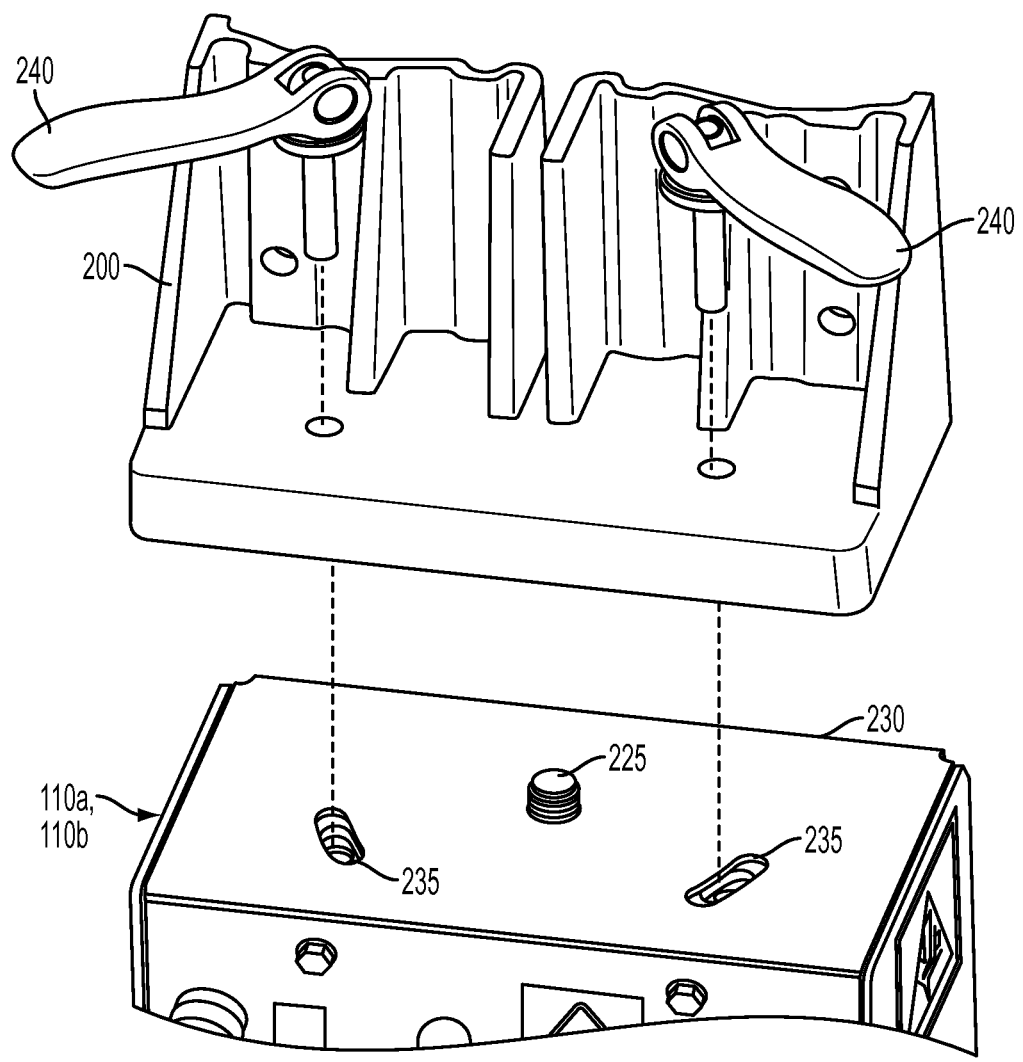
FIGS. 8A and 8B are perspective views diagrammatically illustrating an exemplary clamp according to various embodiments.
Figure 8B:
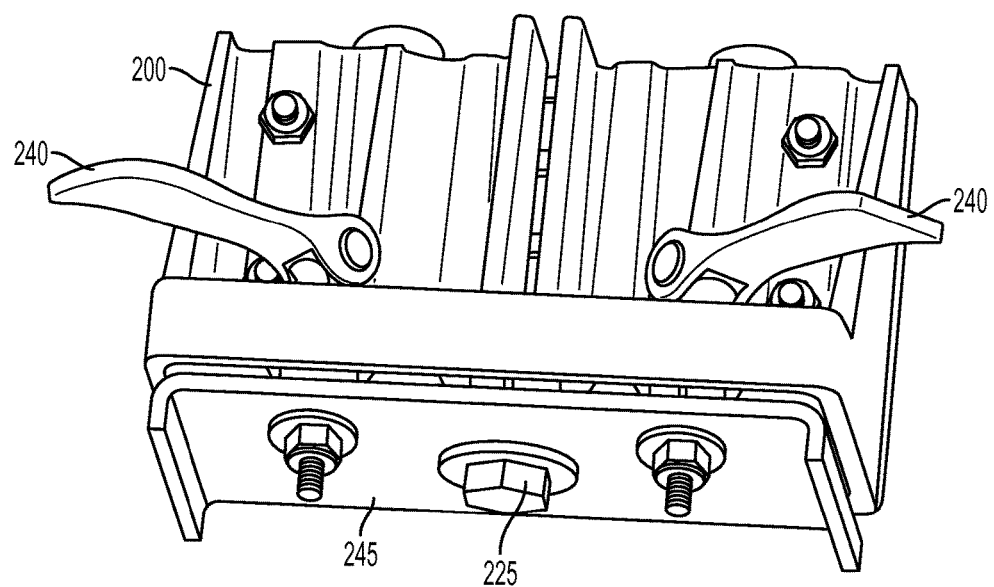

As shown in FIG. 6, the T-shaped bar 170 is rigidly attached to the clamp 200 by placing it in the T-shaped slot formed by fixed walls 205 and 210 and movable wall 215, and drawing the movable wall 215 towards the fixed walls 205, 210, as by threaded fasteners 220, thereby clamping bar 170 tightly between the walls 205, 210, 215. As shown in FIGS. 6 and 8A-B, the clamp 200 is secured to the lower pedestal 110a, 110b by a center bolt 225 that allows the clamp 200 to pivot horizontally. A top flange 230 of the pedestal 110a, 110b has slots 235, and the base of clamp 200 has holes through which the shafts of a pair of cam levers 240 respectively pass and are fastened under top flange 230 and a doubler plate 245 that fits inside the pedestal. Thus, top flange 230 is sandwiched between doubler plate 245 and clamp 200.

Clamp 200 is pressed against and locked to top flange 230 by downward pressure applied by the cam action of the cam levers 240 when they are in a locked position shown in FIG. 6. When the cam levers 240 are raised and in their released position (not shown), the center bolt 225 keeps the assembly of clamp 200 and columnar tower 105a, 105b centered, and the tower 105a, 105b can be pivoted through the range of the slots 235. Thus, the slots 235 allow some rotational adjustment of the bar 170 (and hence the camera pod 120a, 120b) relative to the pedestal 110a, 110b. When the cam levers 240 are lowered, the doubler plate 245, pedestal top flange 230, and clamp 200 are drawn together and immobilized. This mechanism allows quick field assembly since the installing technician only needs to slip the T-bar 170 into the slot formed by the walls 205-215 while the fasteners 220 (which can be pre-assembled to clamp 200) are tightened. No loose fasteners or alignment of holes is required.

Since the camera pods 120a, 120b of the disclosed embodiment are wireless, no wires are needed for communication purposes. However, electrical power must be supplied to each camera pod 120a, 120b for powering the camera(s) and motor drive. In certain embodiments, each pedestal 110a, 110b comprises a power supply 250 including a battery, the power supply 250 electrically connected to its respective camera pod 120a, 120b for supplying all electrical power needed to operate its camera pod. The battery can be a rechargeable battery, and the power supply 250 can further include a charger for charging the battery. In other embodiments, the battery or batteries are removable for remote recharge. In one example, a pedestal-mounted battery is charged from an electrical wall outlet. This battery can be disconnected from the wall, and will supply electrical power to the camera measuring system, allowing each pedestal to have no electrical or communication cables/wires.

In certain embodiments, power supply 250 is designed for a variety of DC input voltages; i.e., 19 volts to 32 volts, enabling commonly used power supplies from laptop computers or printers to be used. This feature is a convenience for local sourcing of components around the world. It provides flexibility to use almost any power supply locally available for inclusion with new units built in Europe or Asia, and has the added advantage that a service technician can purchase a replacement power supply locally if a factory service part is not easily available.

Figure 3:
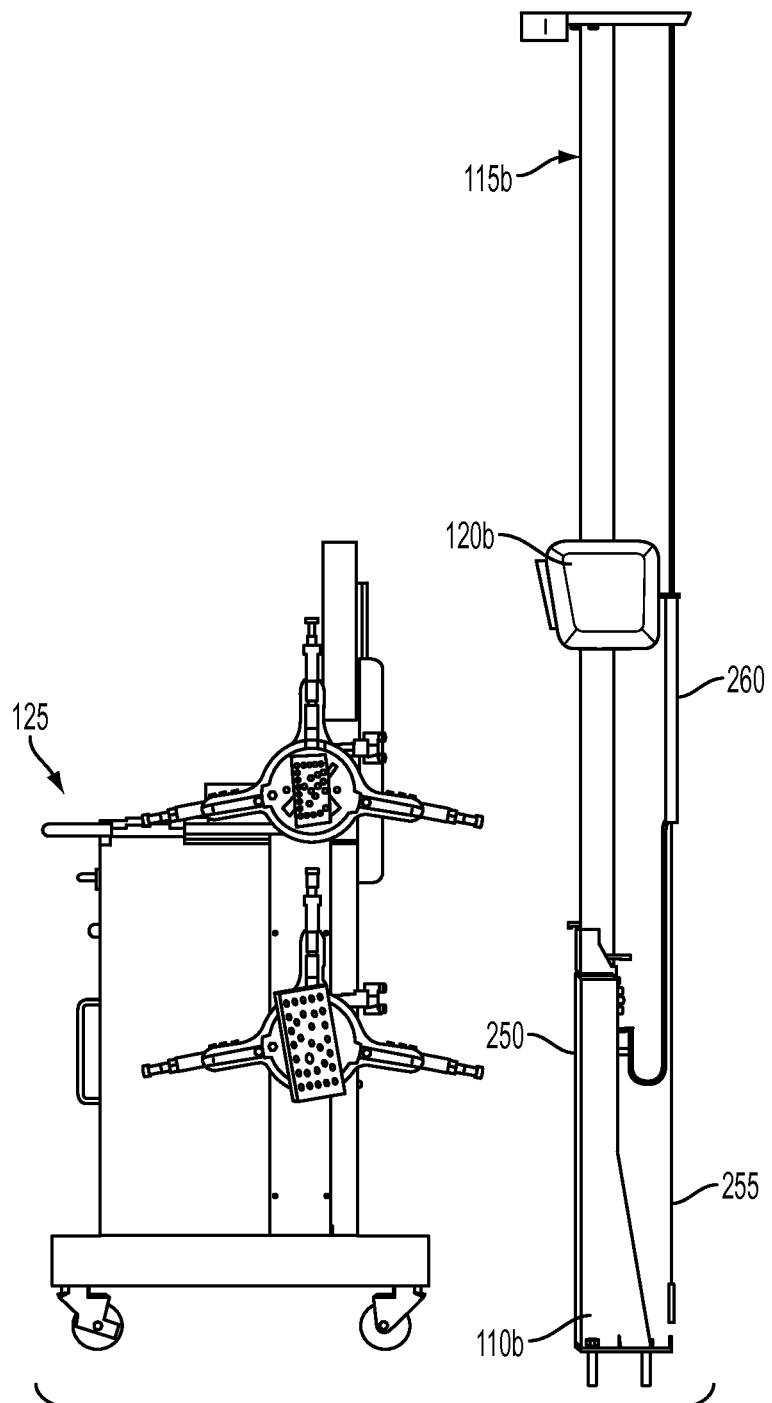
FIG. 3 is a side view of the alignment system of FIG. 2.
Figure 4:
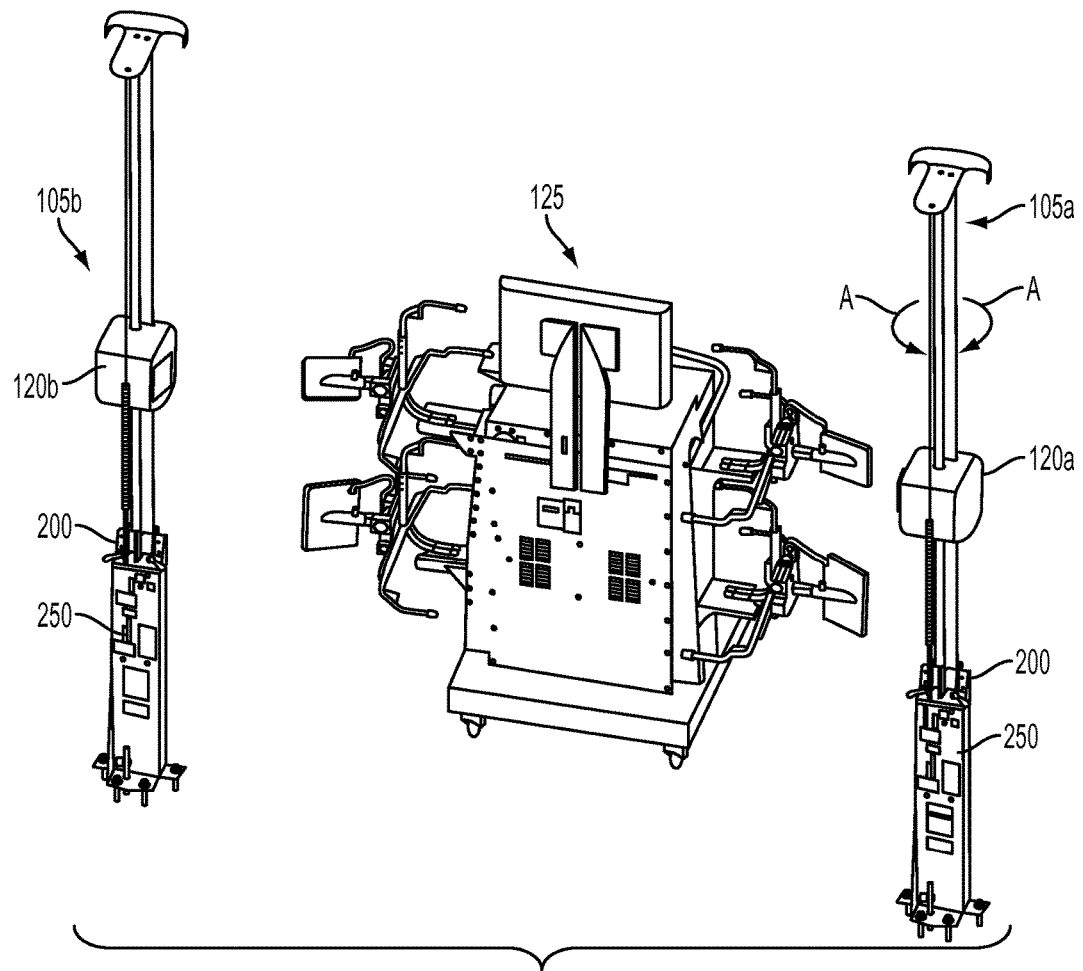
FIG. 4 is a rear perspective view of the alignment system of FIG. 2.

An additional feature of this disclosure is the design of a cable management system, which ensures power from the power supply 250 is connected to the cameras and motors, while allowing the camera and pod assembly 120a, 120b to freely move vertically along the columnar tower 115a, 115b. Referring now to FIG. 3, this is accomplished in certain embodiments by a spring-tensioned guide wire 255, extending from a lower portion of the pedestal 110a, 110b to a top portion of the tower 115a, 115b. A coiled electrical cable 260 is connected between the power supply 250 and the camera pod 120a, 120b, and disposed around the guide wire 255. This design allows the motor driven camera pod 120a, 120b to move up and down the tower 115a, 115b, stretching the coiled cable 260 in the process, and preventing entanglement of the cable 260 or excess stress in its electrical wires.

Figure 9A:
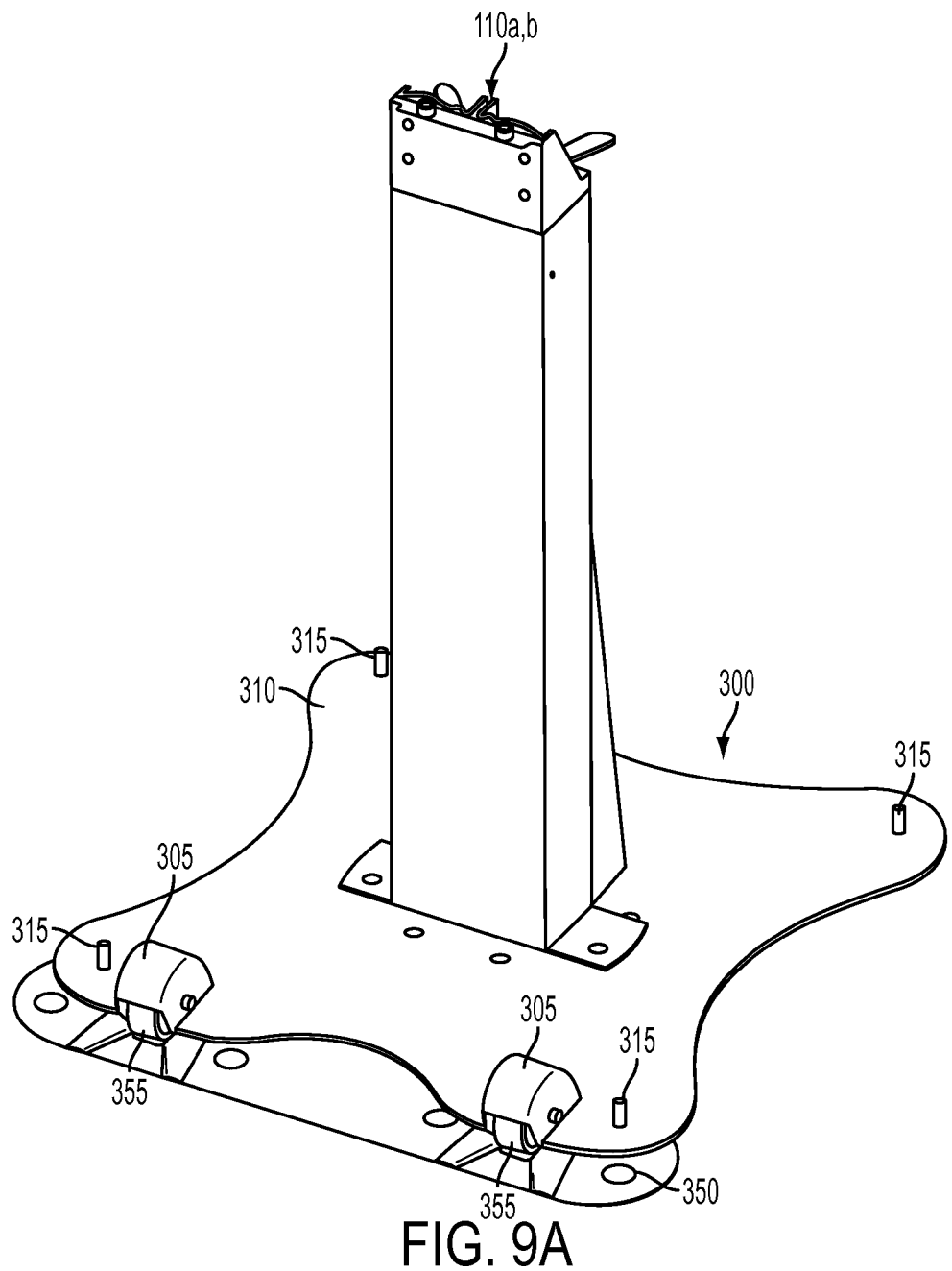
FIGS. 9A and 9B are perspective and side views, respectively, diagrammatically illustrating an exemplary portable base according to various embodiments.
Figure 9B:
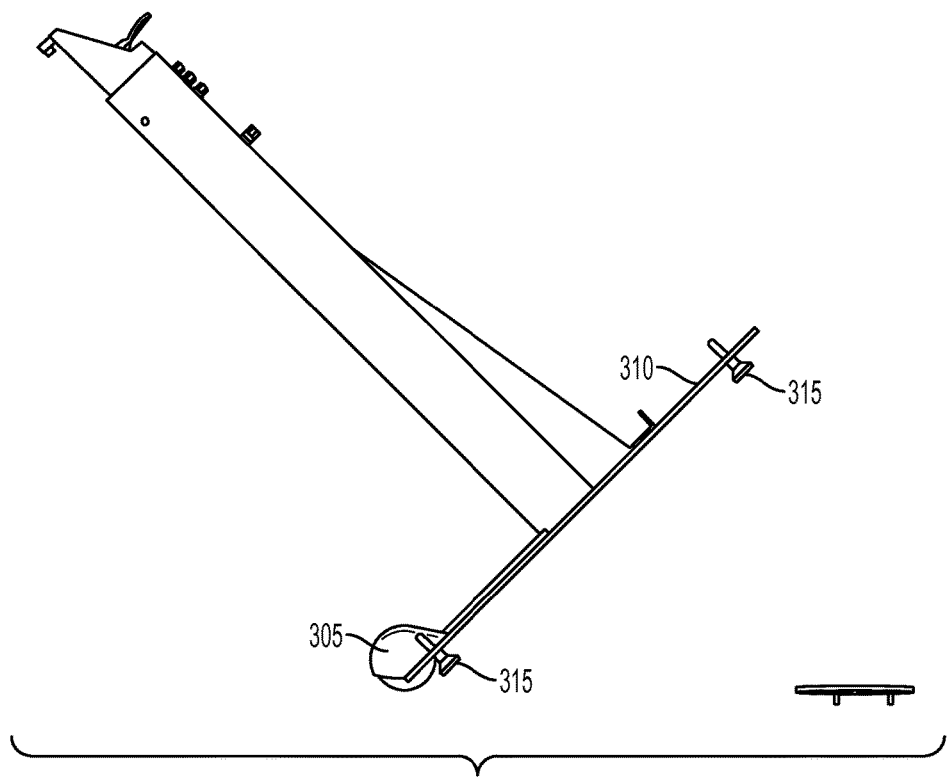

In some embodiments, the disclosed wireless alignment system is rendered portable around a shop to multiple alignment bays. This portability is made possible by a wheeled base, which allows the base tower assemblies 105a, 105b to be easily moved about the shop as required. Referring now to FIGS. 9A-B, each of the base tower assemblies 105a, 105b comprises a portable base 300 attachable to a lower distal portion of the pedestal 110a, 110b, the portable base 300 having at least one wheel 305 engageable with a floor surface for moving the base tower assembly 105a, 105b. The portable base 300 comprises a plate 310 having a plurality of leveling feet 315 for leveling the base tower assembly 105a, 105b, and the at least one wheel 305 is for selectively engaging the floor surface by tilting the plate 310. For example, portable base 300 has a pair of wheels 305 mounted to the plate 310, and four of the leveling feet 315. The base 300 is tipped forward a few degrees, allowing the wheels 305 to contact the floor, thus allowing the base 300 to be easily rolled around the shop to a new alignment location.

Figure 10:
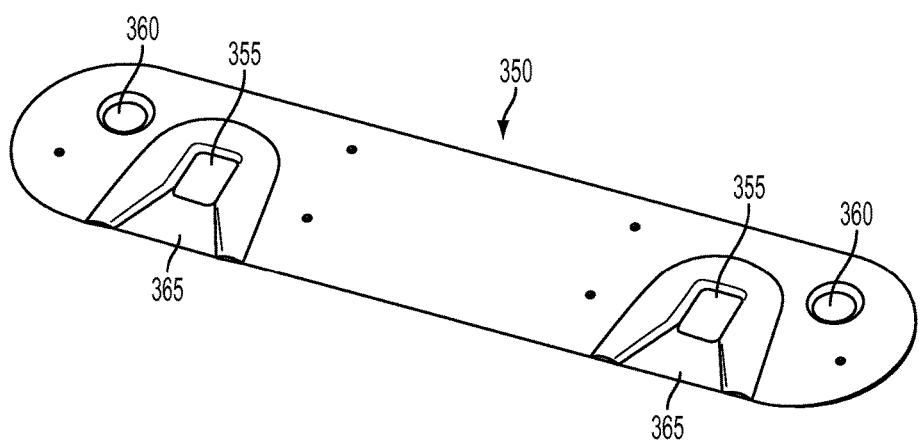
FIG. 10 is a perspective view diagrammatically illustrating an exemplary docking station according to various embodiments.

In certain embodiments, a docking station 350 as shown in FIG. 10 is provided that allows the portable base 300 attached to base tower assembly 105a, 105b to be repeatedly located in the correct alignment position with respect to an alignment rack. The docking station 300 is fastened to the floor in a pre-determined location with respect to the alignment rack. A docking station 350 is associated with each base tower assembly 105a, 105b. Each docking station 350 is fixedly attachable to the floor, for engaging the at least one wheel 305 of the portable base 300 of its associated pedestal 105a, 105b to orient the pedestal relative to the docking station 350.

Each docking station 350 comprises a pocket 355 for receiving the at least one wheel 305 of its associated pedestal 105a, 105b, and for indicating to a user that the wheel 305 is engaged with the docking station 350. The docking station can also include a funnel shaped area 365 to guide the wheel 305 into the pocket 355. The docking plate can be made in a bright color (e.g., yellow or red) to make it highly visible to the user. To lock the cart into position such that it cannot be moved inadvertently (e.g., bumped), each docking station 350 can also comprise a pocket 360 for receiving at least one of the leveling feet 315 of its associated pedestal 105a, 105b for locking the pedestal to the docking station 350. As seen in FIG. 9A, in one embodiment each portable base 300 has a pair of the wheels 305 mounted to its plate 310, and a pair of the leveling feet 315, and each docking station 350 has a pair of pockets 355 for receiving the pair of wheels 305, and a pair of pockets 360 for receiving the pair of leveling feet 315. In certain embodiments, docking station 350 includes an electrical connection to the pedestal power supply 250.

The disclosed system provides several advantages. No wires are required to connect the cameras to the PC. Thus, the PC and its hosting cabinet can be moved to any position around the vehicle for an easier and/or more customizable set up. Also, problems with bystander or user entanglement in conventional wired connections between cameras and PC are eliminated. The disclosed system allows the imaging cameras to be easily moved around the shop from bay to bay as needed, and allows the imaging cameras to be used as audit aligners in a drive-through shop area where no connecting wires are desired. Moreover, the disclosed system provides flexibility so that wireless camera pods can be mounted directly to a wall or ceiling, allowing the shop floor area to be open for vehicle and pedestrian traffic.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described several examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A portable vehicle alignment system, comprising:
a pair of base tower assemblies, each base tower assembly comprising a pedestal, a columnar tower removably attachable to a top portion of the pedestal to extend substantially vertically upward from the pedestal, and a camera pod mounted to move along a length of the tower; and
a data processor for processing image data from the camera pods, and having a wireless communication device;
wherein a first one of the camera pods comprises a first camera for capturing image data of a first target mounted on a vehicle, a calibration target disposed in a fixed relationship to the first camera, and a wireless communication device for communicating with the data processor's wireless communication device;
wherein a second one of the camera pods comprises a second camera for capturing image data of a second target mounted on the vehicle, a calibration camera disposed in a fixed relationship to the second camera for capturing images of the calibration target, and a wireless communication device for communicating with the data processor's wireless communication device;
wherein each camera pod has a motor drive to move the pod along the length of the tower, and the data processor is for controlling the motor drives using the images captured by the calibration camera such that the motion of the camera pods is synchronous with each other;
wherein the base tower assemblies are each separately movable by a user; and
wherein each of the pedestals comprises a manually-operated clamp proximal its top portion for removably fixedly attaching the tower to the pedestal in one of a plurality of positions such that the orientation of the camera pod to the pedestal is angularly adjustable, allowing horizontal rotation of the camera pod.

2. The system of claim 1, wherein each of the base tower assemblies further comprises a portable base attachable to a lower distal portion of the pedestal, the portable base having at least one wheel engageable with a floor surface for moving the base tower assembly.

3. The system of claim 2, wherein the portable base comprises a plate having a plurality of leveling feet for leveling the base tower assembly, and the at least one wheel is for selectively engaging the floor surface by tilting the plate.

4. The system of claim 2, further comprising a docking station associated with each base tower assembly, each docking station being fixedly attachable to the floor;
wherein each docking station is for engaging the at least one wheel of its associated pedestal to orient the pedestal relative to the docking station.

5. The system of claim 4, wherein each docking station comprises a pocket for receiving the at least one wheel of its associated pedestal and for indicating to a user that the wheel is engaged with the docking station.

6. The system of claim 5, wherein each docking station comprises a pocket for receiving at least one of the leveling feet of its associated pedestal for locking the pedestal to the docking station.

7. The system of claim 4, wherein each pedestal comprises a power supply electrically connected to its camera pod, and each docking station includes an electrical connection to the pedestal power supply.

8. The system of claim 1, each pedestal comprising:
a power supply for providing power to its associated camera pod;
a guide wire extending from a lower portion of the pedestal to a top portion of the tower; and
a coiled electrical cable connected between the power supply and the camera pod, and disposed around the guide wire.

9. The system of claim 1,
wherein each tower comprises a bar having a T-shaped cross section, and the bar has a linear rack of gear teeth; and
wherein each tower's associated camera pod has a slide car for engaging the bar to guide motion of the camera pod along the bar, and the motor drive of the associated camera pod has a pinion gear for engaging the rack to drive the camera pod along a length of the bar.

10. The system of claim 1, wherein each tower comprises a stationary bar, a lead screw, and a motor for rotating the lead screw;
wherein each tower's associated camera pod has a slide car for engaging the bar to guide motion of the camera pod along the bar, the slide car comprising a threaded portion for engaging the lead screw to drive the camera pod along a length of the bar when the lead screw is rotated by the motor.

11. The system of claim 10, wherein the bar and slide car are for preventing rotation of the camera pod as it moves relative to the tower.

12. The system of claim 8, wherein the power supply comprises a rechargeable battery and a charger for charging the battery.

13. The system of claim 8, wherein the power supply comprises a rechargeable battery.

14. A portable vehicle alignment system, comprising:
a pair of base tower assemblies, each base tower assembly comprising a pedestal, a columnar tower removably attachable to a top portion of the pedestal to extend substantially vertically upward from the pedestal, and a camera pod mounted to move along a length of the tower; and
a data processor for processing image data from the camera pods, and having a wireless communication device;
wherein a first one of the camera pods comprises a first camera for capturing image data of a first target mounted on a vehicle, a calibration target disposed in a fixed relationship to the first camera, and a wireless communication device for communicating with the data processor's wireless communication device;
wherein a second one of the camera pods comprises a second camera for capturing image data of a second target mounted on the vehicle, a calibration camera disposed in a fixed relationship to the second camera for capturing images of the calibration target, and a wireless communication device for communicating with the data processor's wireless communication device;
wherein each camera pod has a motor drive to move the pod along the length of the tower, and the data processor is for controlling the motor drives using the images captured by the calibration camera such that the motion of the camera pods is synchronous with each other; and
wherein each pedestal comprises a power supply electrically connected to its camera pod for supplying all electrical power needed to operate its camera pod, each power supply having a battery.

15. The system of claim 14, wherein each of the base tower assemblies further comprises a portable base attachable to a lower distal portion of the pedestal, the portable base having at least one wheel engageable with a floor surface for moving the base tower assembly.

16. The system of claim 15, wherein the portable base comprises a plate having a plurality of leveling feet for leveling the base tower assembly, and the at least one wheel is for selectively engaging the floor surface by tilting the plate.

17. The system of claim 14, wherein each of the pedestals comprises a manually-operated clamp proximal its top portion for removably fixedly attaching the tower to the pedestal.

18. The system of claim 17, wherein the clamp is for attaching the tower to the pedestal in one of a plurality of positions such that the orientation of the camera pod to the pedestal is angularly adjustable, allowing horizontal rotation of the camera pod.

19. The system of claim 15, further comprising a docking station associated with each base tower assembly, each docking station being fixedly attachable to the floor;
wherein each docking station is for engaging the at least one wheel of its associated pedestal to orient the pedestal relative to the docking station.

20. The system of claim 19, wherein each docking station comprises a pocket for receiving the at least one wheel of its associated pedestal and for indicating to a user that the wheel is engaged with the docking station.

21. The system of claim 20, wherein each docking station comprises a pocket for receiving at least one of the leveling feet of its associated pedestal for locking the pedestal to the docking station.

22. The system of claim 19, wherein each docking station includes an electrical connection to the pedestal power supply.

23. The system claim 14, each pedestal comprising:
a power supply for providing power to its associated camera pod;
a guide wire extending from a lower portion of the pedestal to a top portion of the tower; and
a coiled electrical cable connected between the power supply and the camera pod, and disposed around the guide wire.

24. The system of claim 23, wherein the power supply comprises a rechargeable battery and a charger for charging the battery.

25. The system of claim 23, wherein the power supply comprises a rechargeable battery.

* * * * *